US009637191B2

(12) United States Patent
Lee (10) Patent No.: US 9,637,191 B2
(45) Date of Patent: May 2, 2017

(54) LED SIGNALING DEVICE FOR A BICYCLE

(71) Applicant: TENNUS INDUSTRIAL CO., LTD., Taichung (TW)

(72) Inventor: Ching-Chiang Lee, Taichung (TW)

(73) Assignee: TENNUS INDUSTRIAL CO., LTD., Taichung (TW)

( * ) Notice: Subject to any disclaimer, the term of this patent is extended or adjusted under 35 U.S.C. 154(b) by 176 days.

(21) Appl. No.: 14/554,315

(22) Filed: Nov. 26, 2014

(65) Prior Publication Data

US 2016/0144918 A1 May 26, 2016

(51) Int. Cl.
*B60Q 1/34* (2006.01)
*B60Q 1/44* (2006.01)
*B62H 5/20* (2006.01)
*B62J 6/00* (2006.01)
*B62J 6/04* (2006.01)

(52) U.S. Cl.
CPC ............. *B62H 5/20* (2013.01); *B62J 6/005* (2013.01); *B62J 6/04* (2013.01)

(58) Field of Classification Search
CPC ..... F21L 4/027; F21S 4/28; F21S 9/02; F21V 23/005; F21V 23/04; F21V 23/0407; F21W 2101/023; F21W 2101/027; F21W 2101/12; F21W 2101/14; F21Y 2105/001; B60Q 1/2607; B60Q 1/34; B60Q 1/343; B60Q 1/44; B60Q 1/382; B60Q 1/385; B60Q 1/144
See application file for complete search history.

(56) References Cited

U.S. PATENT DOCUMENTS

| 5,797,672 | A | * | 8/1998 | Dobert | B60Q 1/2615 362/190 |
| 6,538,567 | B2 | * | 3/2003 | Stewart | A41D 13/01 340/475 |
| 6,679,615 | B2 | * | 1/2004 | Spearing | B60Q 1/2673 340/475 |
| 6,870,474 | B1 | * | 3/2005 | Brothers | B60Q 1/444 340/441 |
| 6,897,771 | B1 | * | 5/2005 | Lodhie | B60Q 1/2607 340/464 |
| 7,077,538 | B2 | * | 7/2006 | Wooldridge | A41D 13/01 362/103 |
| 7,667,586 | B2 | * | 2/2010 | Cheng | B60Q 1/2676 180/167 |
| 7,857,479 | B1 | * | 12/2010 | Marroquin | A42B 3/0453 340/479 |
| 8,807,778 | B1 | * | 8/2014 | Latchman | A42B 3/0453 362/105 |

(Continued)

FOREIGN PATENT DOCUMENTS

| EP | 1394029 A2 | 3/2004 | |
| GB | EP 1394029 A2 * | 3/2004 | ............. B62J 6/005 |
| GB | 2450882 A | 1/2009 | |

*Primary Examiner* — Ismael Negron
(74) *Attorney, Agent, or Firm* — Muncy, Geissler, Olds & Lowe, P.C.

(57) ABSTRACT

A bicycle LED signaling device for a bicycle includes a lighting module with at least one array of light emitting diodes (LEDs), a power source, an operation interface, and a controller connected to the power source and the operation interface to receive an operation command to control the LED array to display a corresponding signal.

3 Claims, 10 Drawing Sheets

(56) References Cited

U.S. PATENT DOCUMENTS

| | | | | |
|---|---|---|---|---|
| 9,010,975 B2* | 4/2015 | Norris | ............... | F21S 48/22 |
| | | | | 362/545 |
| 9,096,174 B1* | 8/2015 | Banks | ............... | B60Q 1/34 |
| 2004/0058722 A1* | 3/2004 | Yang | ............... | B60Q 1/2673 |
| | | | | 455/575.6 |
| 2010/0214113 A1 | 8/2010 | Chang | | |
| 2013/0307678 A1* | 11/2013 | Ransom | ............... | B62J 6/005 |
| | | | | 340/432 |

* cited by examiner

LED SIGNALING DEVICE FOR A BICYCLE

BACKGROUND OF THE INVENTION

1. Field of the Invention

The present invention relates to an LED (Light emitting diode) signaling device for a bicycle and, more particularly, to an LED signaling device mounted on a bicycle to alert passerby or transportation tools in front or back of the bicycle.

2. Description of the Related Art

Bicycles have become an increasingly popular mid-distance and short-distance transportation tool and an exercise tool lately because of the eco-friendly nature thereof. However, just like any other transportation tools, the prevalence of bicycles brings forth escalating accident rate. People realize that cycling may put cyclists under the threat of injury or death as a result of accidents. Therefore, many bike manufacturers start focusing on improvement for bike safety, such as front wheel and rear wheel brakes, material and weight of bike frame, passive reflector, active signaling and flashing indicators and the like, to enhance the safety of cyclists upon cycling.

Figure 10A:
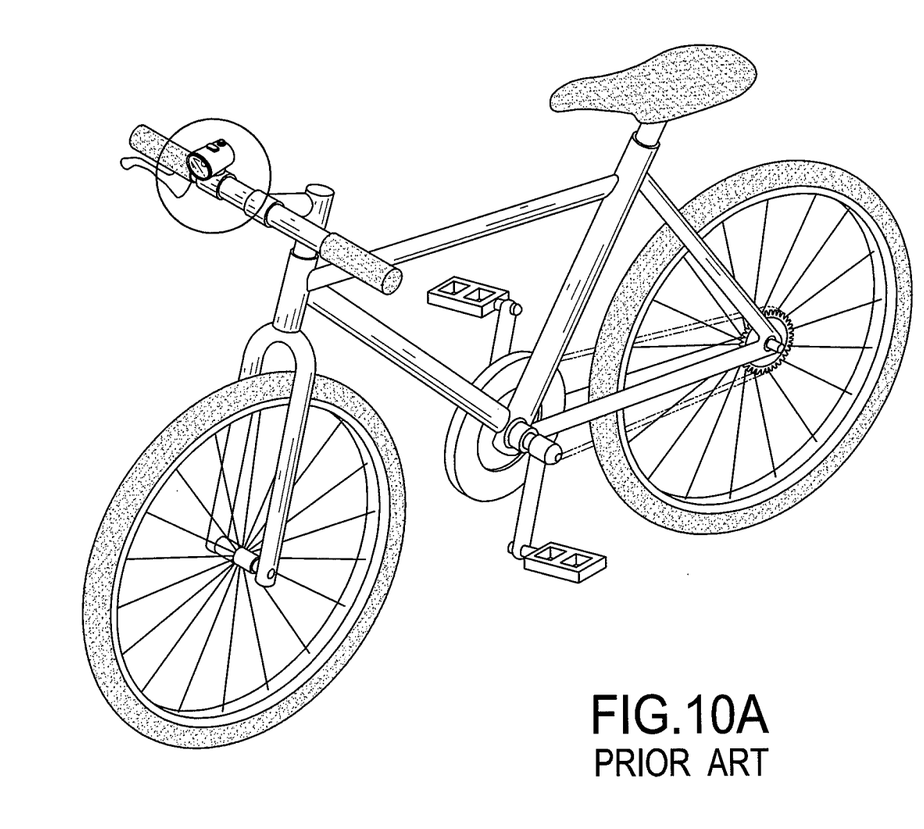
FIG. 10A is perspective view of a conventional bike lighting device mounted on a bike.
Figure 10B:
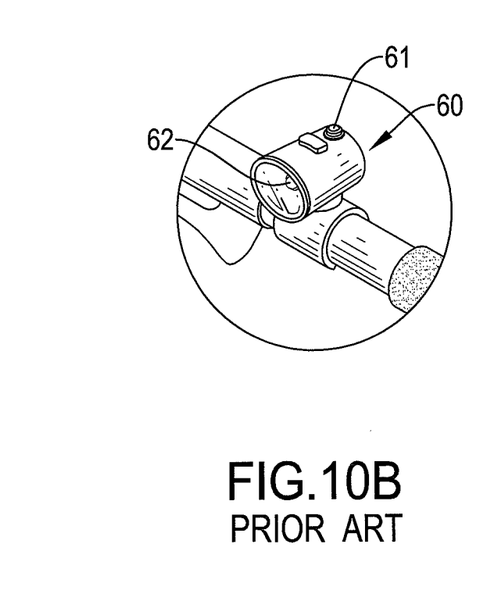
FIG. 10B is an enlarged perspective view of the conventional bike lighting device in FIG. 10A.

With reference to FIGS. 10A and 10B, a conventional bike lighting device has a switch 61 mounted on a housing 60 of the bike lighting device to alternately turn on and off a light source 62 and to connect to or disconnect from a power source, thereby controlling the light source 62 to turn on or off or to flicker. However, the conventional lighting device can only alert passerby and vehicles ahead or in the nearby with rather limited signaling features, such as continuous lighting means or flashing lighting means. Neighboring passerby or transportation tools may not have the idea what the next move cyclists would make for avoidance of accident. For example, when cyclists are making a sudden left or right turn or are braking, adjacent passerby or transportation tools may ignore the messages from the cyclists and bring on a traffic accident. Accordingly, the conventional active signaling device needs to be further improved.

SUMMARY OF THE INVENTION

An objective of the present invention is to provide an LED signaling device for a bicycle displaying simple and clear symbols to deliver multiple signaling messages to passerby and drivers of vehicles in the proximity of the bike for getting awareness of next move of the bike and sufficient response time, thereby effectively lowering the chance of bike accident.

To achieve the foregoing objective, the LED signaling device has at least one lighting module, a controller, a power module and an operation interface.

Each one of the at least one lighting module has a light-emitting diode (LED) array mounted on a substrate. The LED array has multiple LEDs arranged in the form of an array.

The controller is electrically connected to each LED of the LED array to control the LED to turn on or turn off.

The power module is electrically connected to the LED array and the controller.

The operation interface is electrically connected to the controller to output at least one operation command to the controller for the controller to drive the LED array to generate a corresponding signal symbol.

The advantages of the present invention reside in that the lighting module is mounted on the front and/or back of a bike, and when intending to send out a signaling message, a cyclist of the bike inputs an operation command to the controller through the operation interface for the controller to turn on/off each LED in the LED array. The controller can light up the LEDs in the LED array partially or wholly. The luminance differences among all lit LEDs in the LED array allows the LED array to generate a specific signal symbol for warning passerby and transportation tools off. Cyclists can output operation commands to the controller through the operation interface for the controller to control the LED array to display simple and clear signal symbols corresponding to the operation commands, such that passerby and drivers in the transportation tools in the proximity of the bike can be aware of the next move of the bike earlier to effectively lower the chance of bike accident.

Other objectives, advantages and novel features of the invention will become more apparent from the following detailed description when taken in conjunction with the accompanying drawings.

DETAILED DESCRIPTION OF THE INVENTION

Figure 1:
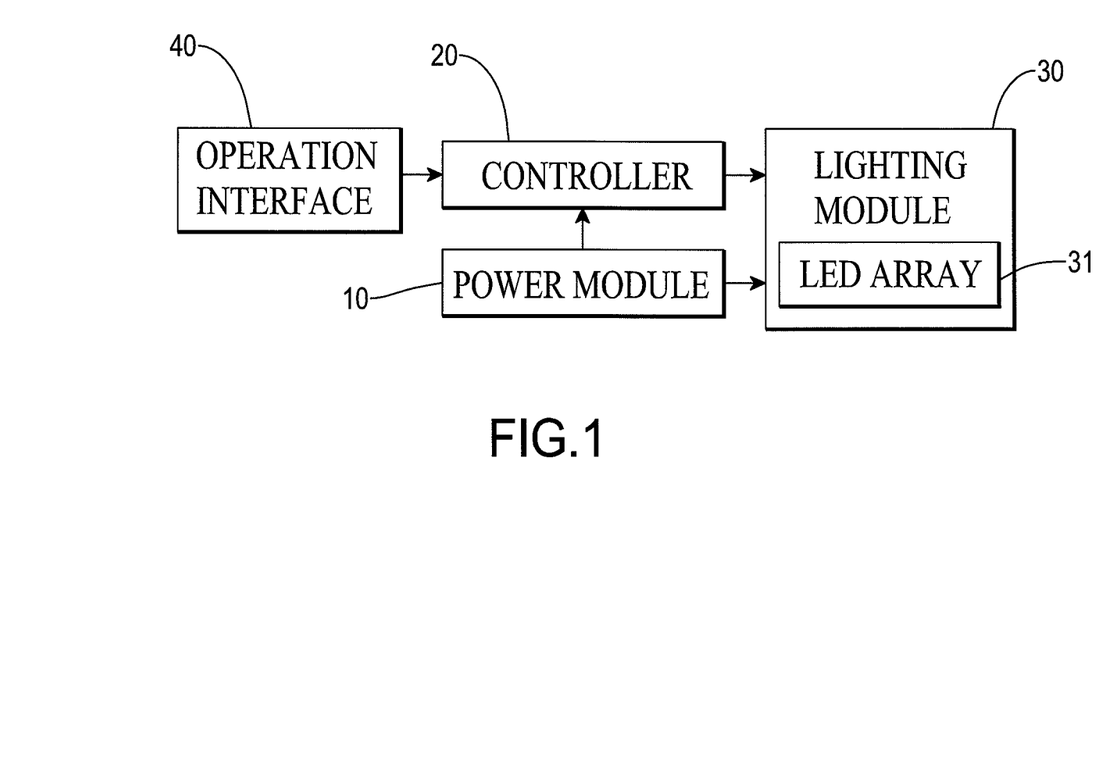
FIG. 1 is a functional block diagram of an LED signaling device for a bicycle in accordance with the present invention.

With reference to FIG. 1, a light emitting diode (LED) signaling device in accordance with the present invention has a power module 10, a controller 20, at least one lighting module 30 and an operation interface 40.

Figure 2:
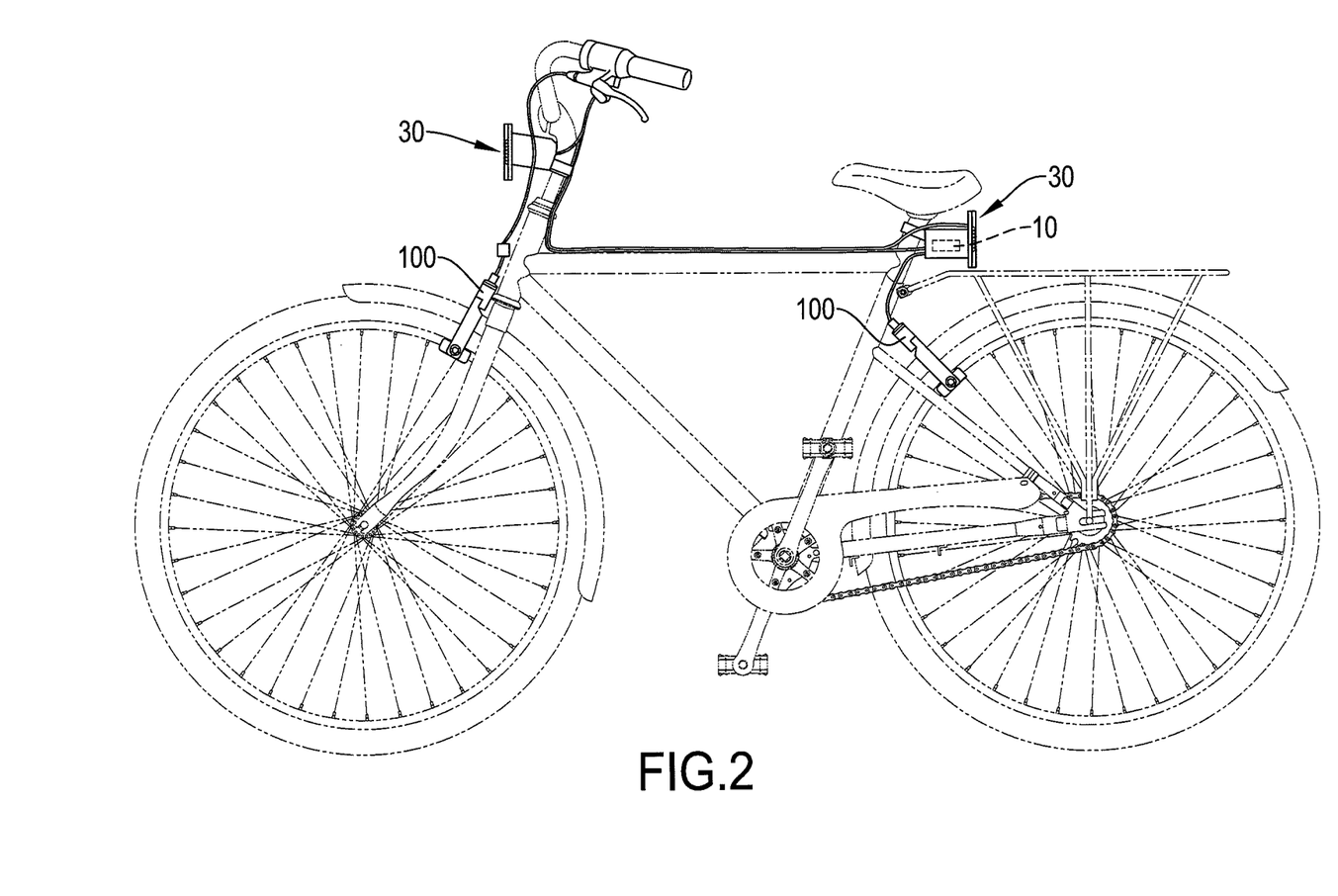
FIG. 2 is a side view of the LED signaling device in FIG. 1 mounted on a bicycle.

Each one of the at least one lighting module 30 has a light-emitting diode (LED) array 31 electrically connected to the controller 20 and the power module 10. The controller 20 is connected to the operation interface 40 and the power module 10 to control the LED array 31 of the lighting module 30 to turn on or turn off. With reference to FIG. 2, the power module 10 is mounted underneath a bike saddle of a bike, and may be an alkaline battery or a lithium battery for supplying or storing power.

Figure 3:
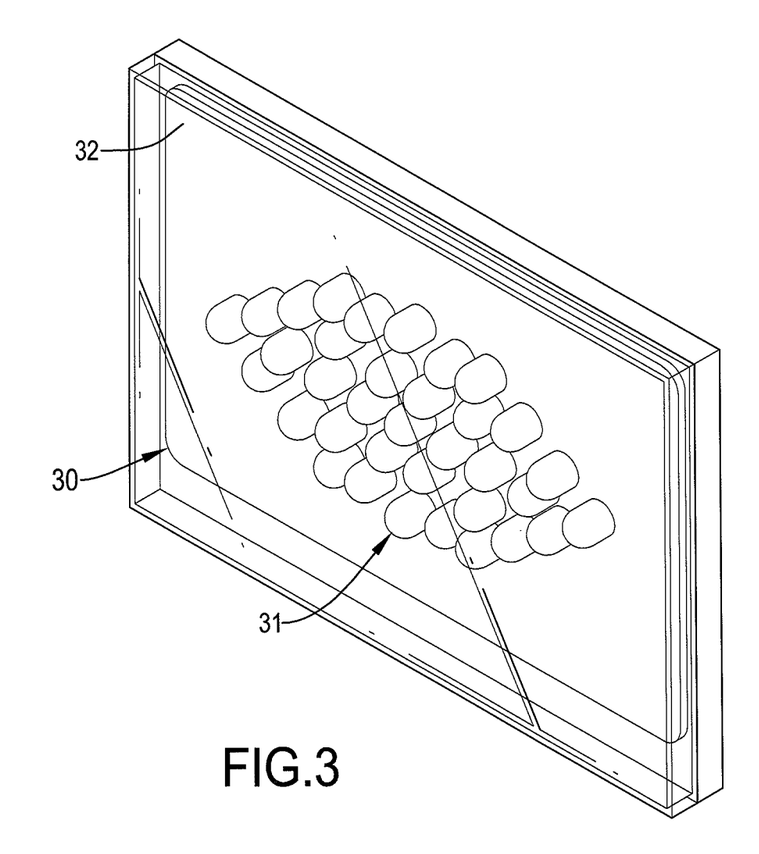
FIG. 3 is a perspective view of a lighting module of the LED signaling device in FIG. 1.
Figure 4:
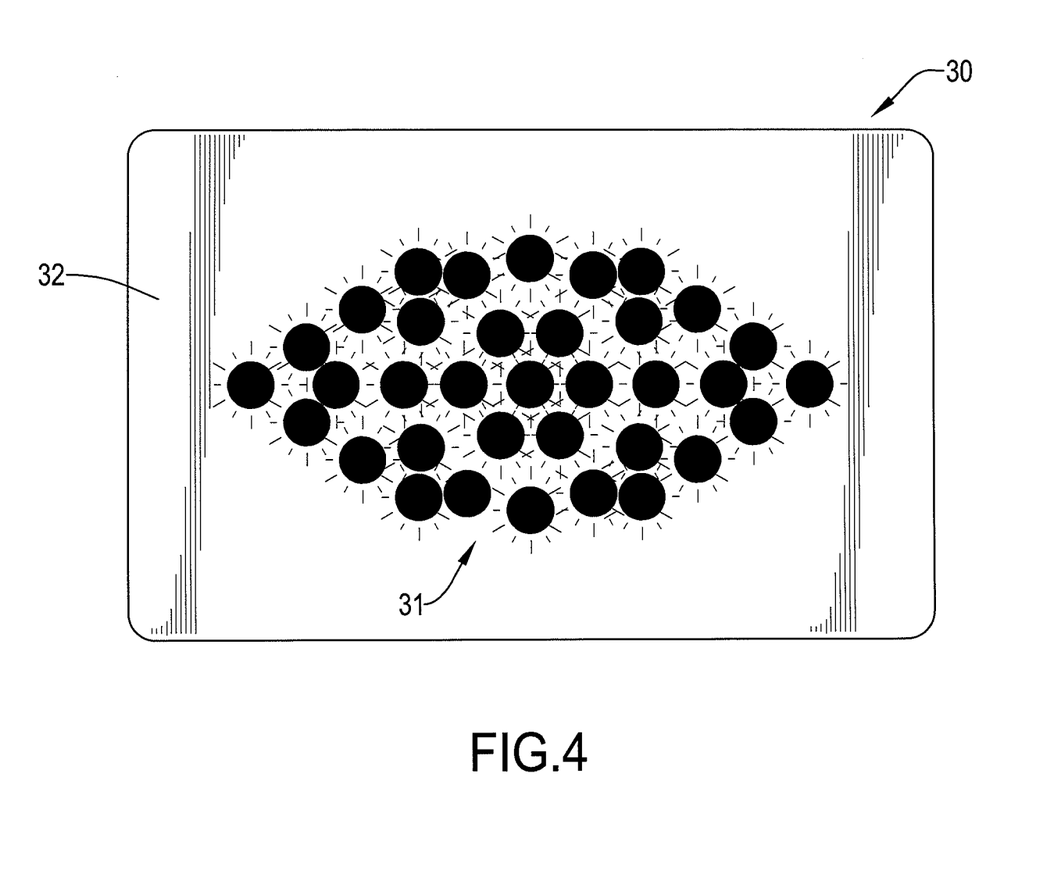
FIG. 4 is a schematic view illustrating a fully-lit symbol of the lighting module in FIG. 3.

With reference to FIGS. 2 and 3, there are two lighting modules 30 are respectively mounted on the front and the back of the bike. Specifically, one of the two lighting modules 30 is mounted on a handlebar of the bike to emit light toward a forward direction, and the other of the two lighting modules 30 is mounted on a saddle tube of the bike to emit light toward a rear direction. The LED array 31 is mounted on a substrate 32 of each lighting module 30, and includes multiple LEDs arranged in the form of an array for aligning and displaying a specific pattern or character. With reference to FIG. 4, the LED array 31 includes two V-shaped portions respectively located on left and right edges thereof. Each V-shaped portion has multiple LEDs emitting yellow or red light. The vertices of the two V-shaped display portions are directed to the left and right of the LED array 31. The LED array 31 further has a center line portion and a patch portion. The center line portion is formed between the two V-shaped portions and having multiple LEDs emitting yellow or red light. The patch portion is formed between the two V-shaped portions, is divided by the center line portion, and has multiple LEDs emitting red light or white light. Alternatively, the LED array 31 may have multiple center line portions formed between the two V-shaped portions, and the patch portion filled in space formed among or outside the V-shaped portions and the center line portions and arranged in the form of customized pattern or characters.

Figure 5:
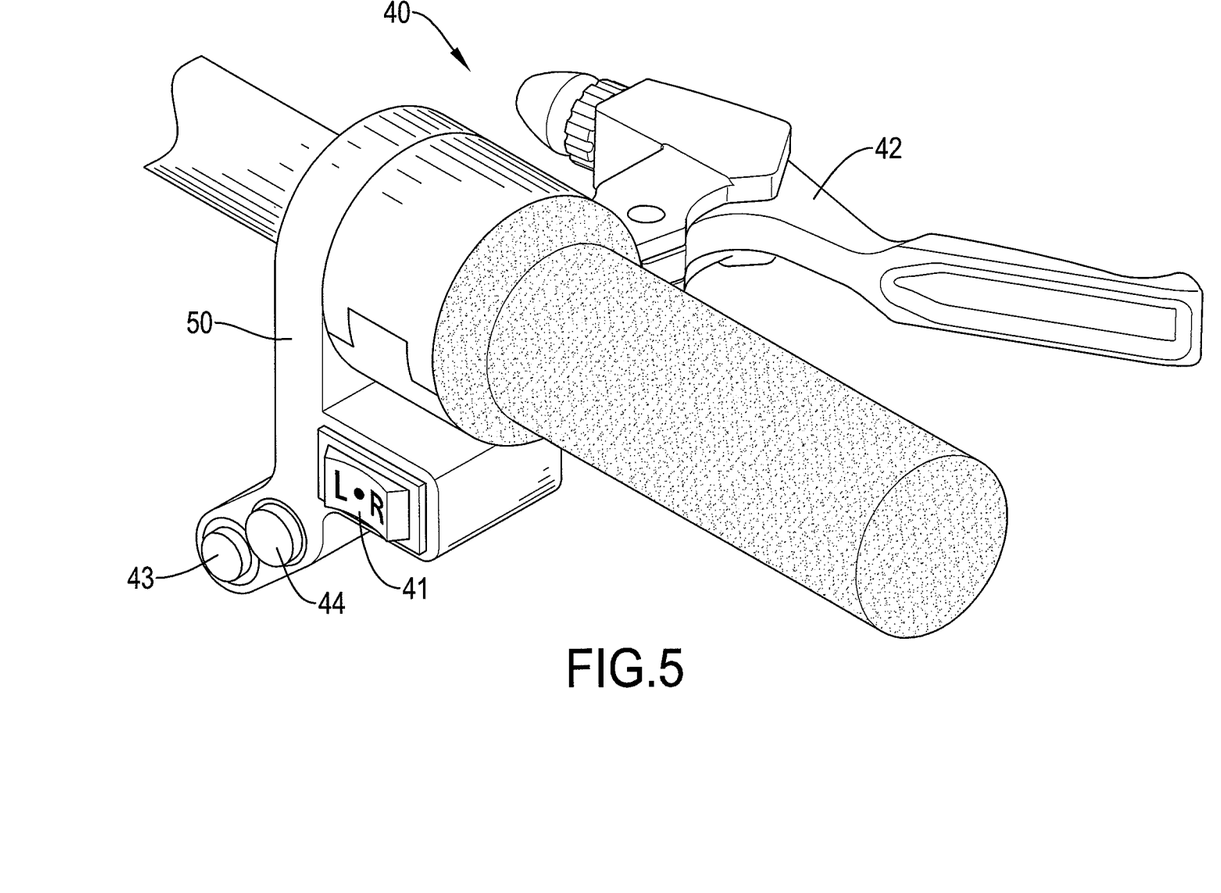
FIG. 5 is a perspective view of an operation interface of the LED signaling device in FIG. 1.

With reference to FIGS. 1, 2 and 5, the operation interface 40 is mounted on one of two handles of the bike, and has a rocker switch 41, two push switches and two brake detectors. The rocker switch 41 is horizontally aligned. Each brake detector is mounted on one of two brakes 100 of the bike to detect a squeezed state of a brake lever 42 in connection with the brake 100. The rocker switch 41 has two ends representing two switch states to be toggled to. In the present embodiment, the end on the left represents a left-turn state and the end on the right represents a right-turn state. The rocker switch 41 and the two push switches are mounted in a housing 50, are located under the handle of the bike, and are partially exposed for cyclists to conveniently operate. One of the two push switches is an emergency or standing button 43, and the other push switch is a night light button 44. A controller 20 is further mounted inside the housing 50, and is electrically connected to the rocker switch 41, the two push switches and the brake detectors to receive operation commands generated from operation of the rocker switch 41, the two push switches and the brake detectors.

When physically implemented, the controller 20 receives at least one operation command inputted from the operation interface 40 and electrically connects a part of LEDs in the LED array 31 to the power module 10 to light up the part of LEDs under an illumination mode according to the at least one operation command. The two illumination mode includes a first illumination state and a second illumination state. The controller 20 controls a value of a current flowing through the LED array 31 during the first illumination state to be lower than the value of the current flowing through the LED array 31 during the second illumination state. Hence, luminance of the LEDs of the LED array 31 lit at the first illumination state is darker than that of the LEDs of the LED array 31 lit at the second illumination state. Meanwhile, the controller 20 disconnects the remaining LEDs in the LED array 31 from the power module 10 to exhibit the remaining LEDs under an unlit mode. To human eyes, varying luminance differences among the LEDs of the LED array 31 allows the LED array 31 to generate a specific signal pattern.

Figure 6:
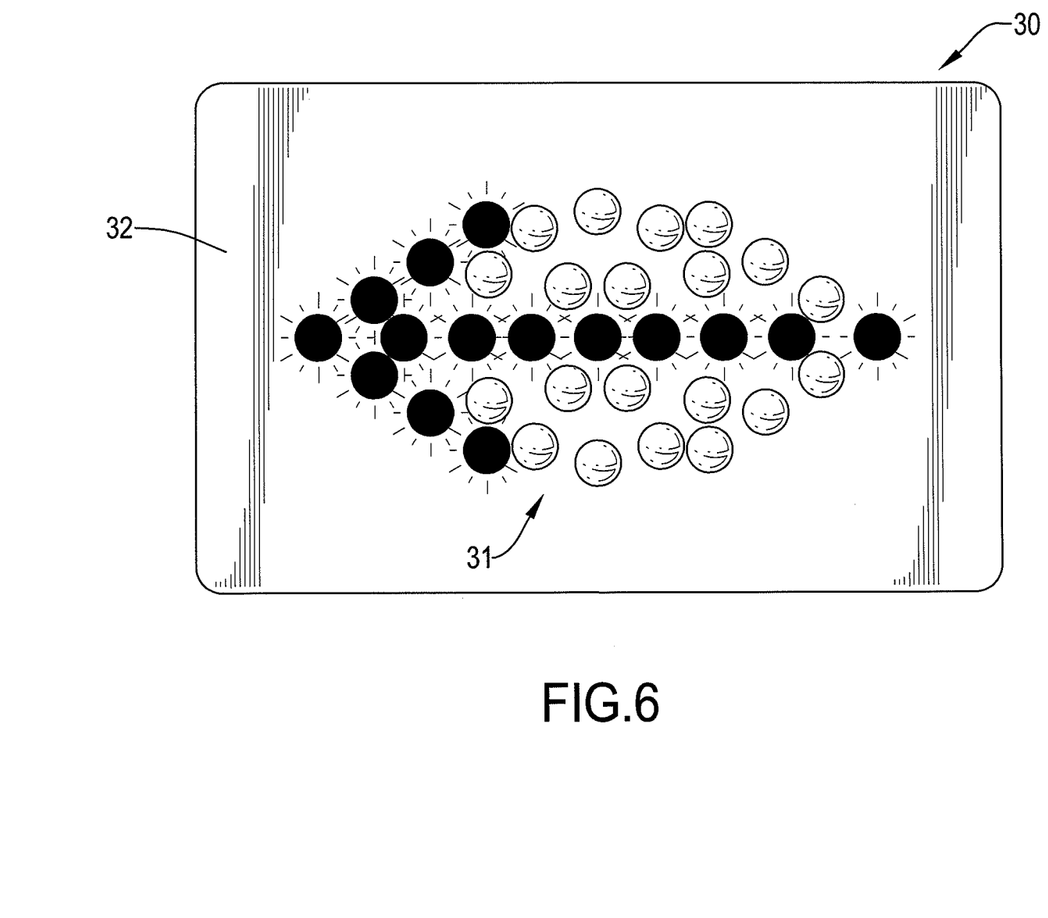
FIG. 6 is a schematic view illustrating a left-turn symbol of the lighting module in FIG. 3.

With reference to FIGS. 5 and 6, when the left end of the rocker switch 41 is pressed, the rocker switch 41 outputs an operation command to the controller 20. The controller 20 then connects the V-shaped portion on the left and the center line portion of the LED array 31 to the power module 10 and lights up and blinks the V-shaped portion on the left and the center line portion under the second illumination state while disconnects the rest of LEDs in the LED array 31 from the power module 10 to exhibit the rest of LEDs under the unlit mode. To human eyes, a left-turn symbol, which takes the form of a left arrow, can be recognized such that passerby and drivers of transportation tools in the proximity of the bike are aware that the bike is going to make a left turn.

Figure 7:
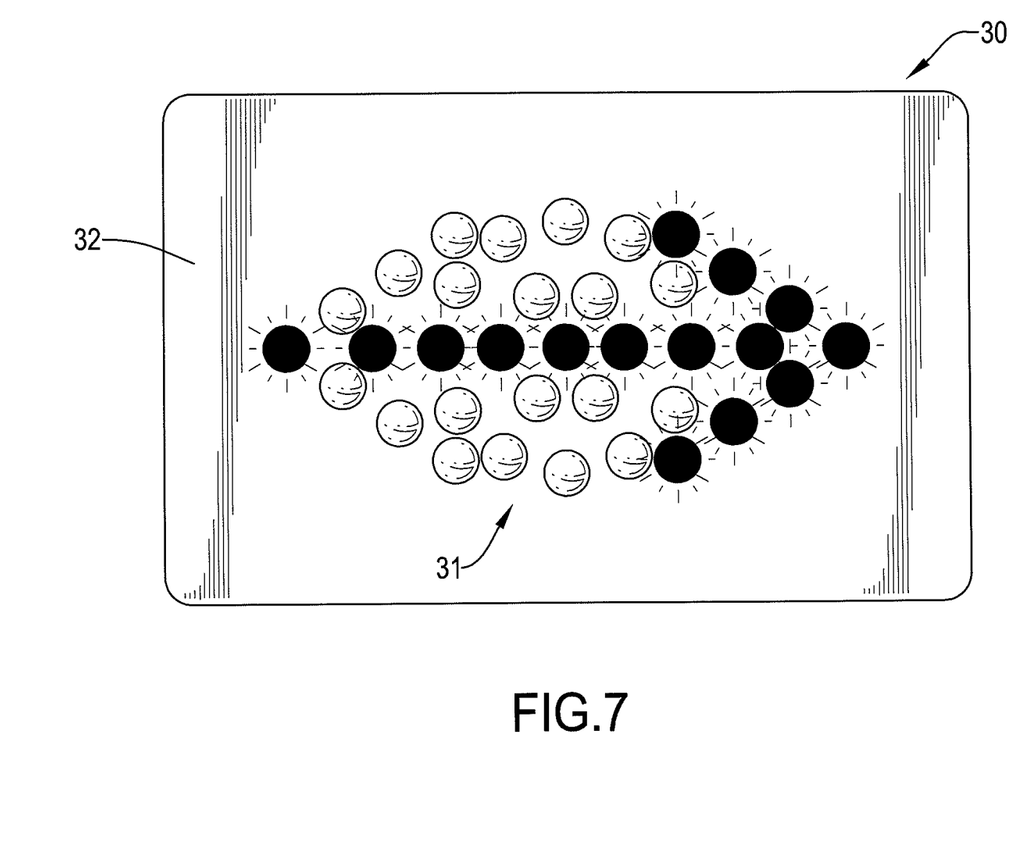
FIG. 7 is a schematic view illustrating a right-turn symbol of the lighting module in FIG. 3.

With reference to FIGS. 5 and 7, when the right end of the rocker switch 41 is pressed, the rocker switch 41 outputs an operation command to the controller 20. The controller 20 then connects the V-shaped portion on the right and the center line portion of the LED array 31 to the power module 10 and lights up and blinks the V-shaped portion on the left and the center line portion under the second illumination state while disconnects the rest of LEDs in the LED array 31 from the power module 10 to exhibit the rest of LEDs under the unlit mode. To human eyes, a right-turn symbol, which takes the form of a right arrow, can be recognized such that passerby and drivers of transportation tools in the proximity of the bike are aware that the bike is going to make a right turn.

Figure 8:
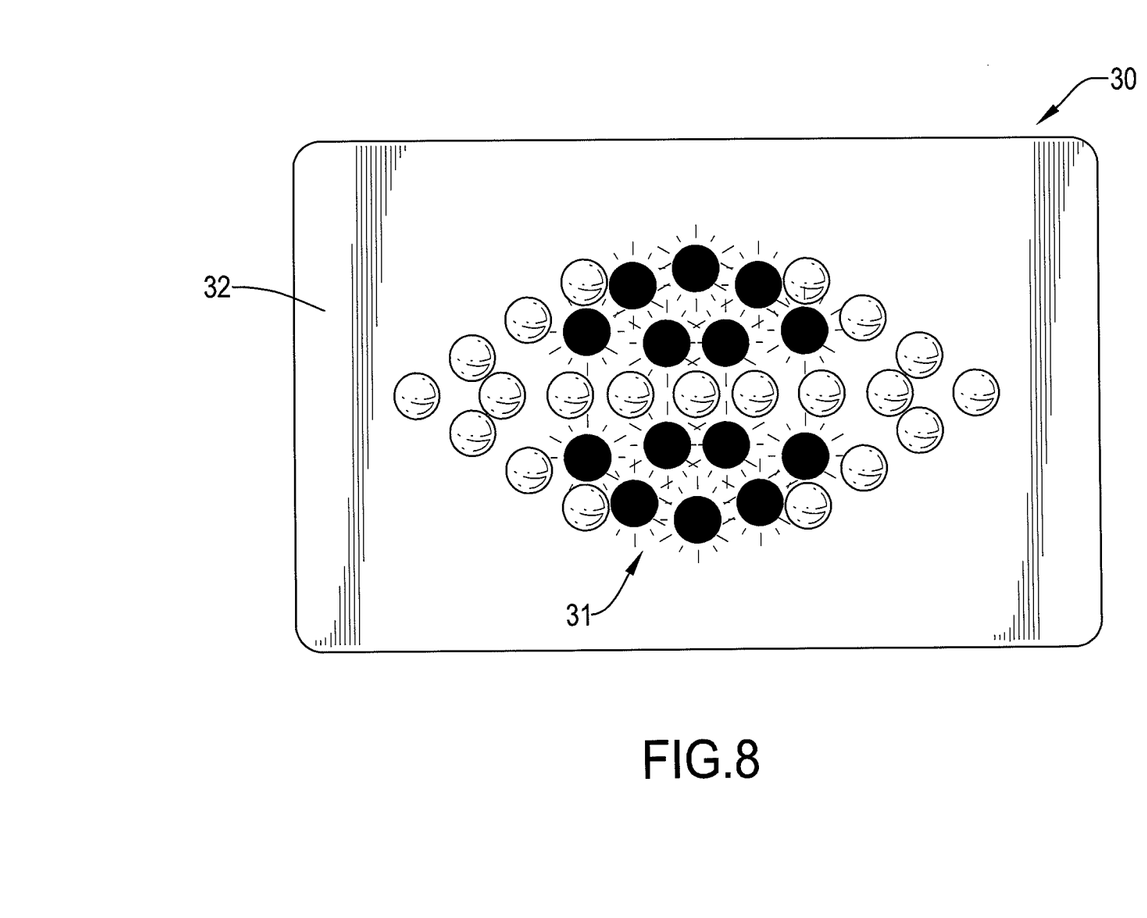
FIG. 8 is a schematic view illustrating a night light symbol or a brake signal symbol of the lighting module in FIG. 3.

With reference to FIGS. 5 and 8, when the brake lever 42 is squeezed, the brake detector connected to the brake lever 42 detects a state change of the brake lever 42, and the brake detector outputs an operation command to the controller 20. The controller 20 then disconnects the V-shaped portions on the left and on the right and the center line portion of the LED array 31 to the power module 10 and exhibits the V-shaped portion on the left and on the right and the center line portion under the unlit mode while connects the rest of LEDs in the LED array 31 to the power module 10 to light up the rest of LEDs under the second illumination state. To human eyes, a round brake signal symbol can be recognized such that passerby and drivers of transportation tools in the proximity of the bike are aware that the cyclist is braking and decelerating the bike.

Figure 9:
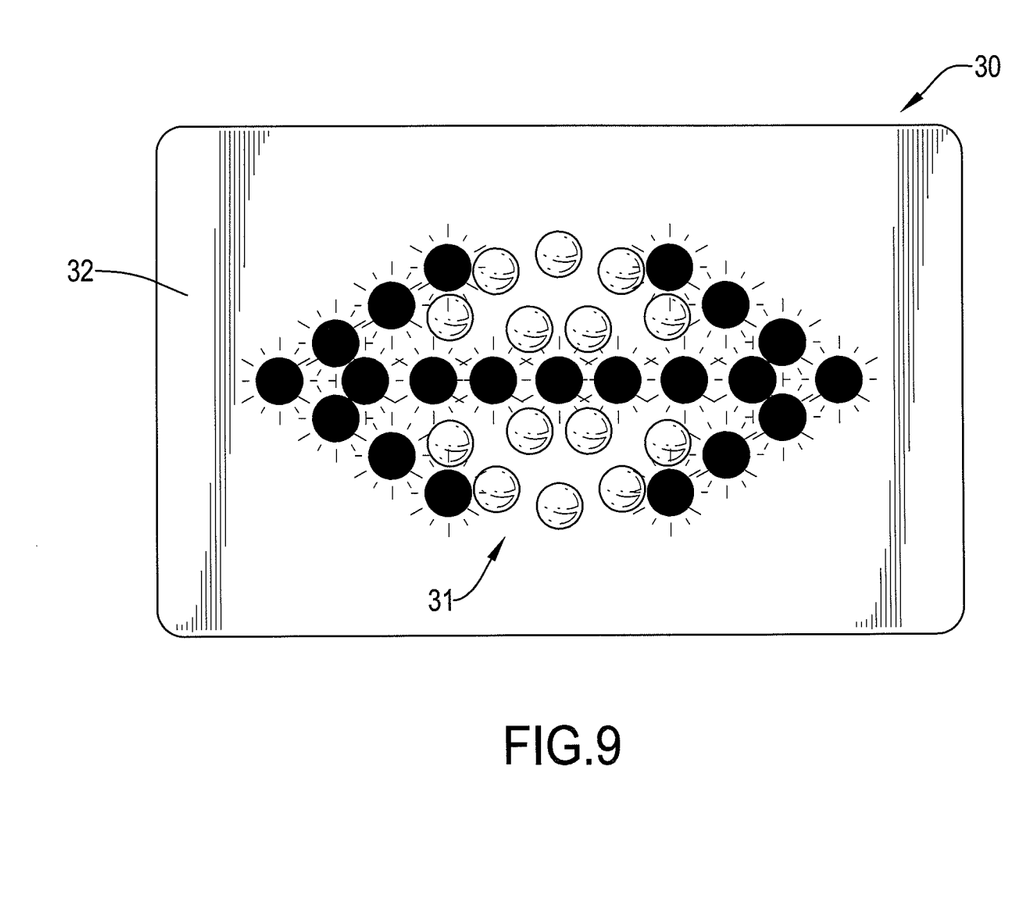
FIG. 9 is a schematic view illustrating an emergency symbol or a standing signal symbol of the lighting module in FIG. 3.

With reference to FIGS. 5 and 9, when the emergency and standing button 43 is pressed, the emergency or standing button 43 outputs an operation command to the controller 20. The controller 20 then connects the V-shaped portions on the left and on the right and the center line portion of the LED array 31 to the power module 10 and lights up and blinks the V-shaped portion on the left and on the right and the center line portion under the second illumination state while disconnects the rest of LEDs in the LED array 31 from the power module 10 to exhibit the rest of LEDs in the unlit mode. To human eyes, an emergency or standing signal symbol in the form of a double-headed arrow pointing to the left and to the right can be recognized such that passerby and drivers of transportation tools in the proximity of the bike are aware that the bike is encountering an emergency or is standing.

With reference to FIGS. 5 and 8, when the night light button 44 is pressed, the night light button 44 outputs an operation command to the controller 20. The controller 20 then disconnects the V-shaped portions on the left and on the right and the center line portion of the LED array 31 to the power module 10 and exhibits the V-shaped portion on the left and on the right and the center line portion under the unlit mode while connects the rest of LEDs in the LED array 31 to the power module 10 to light up the rest of LEDs under the first illumination state. As the value of the current flowing through the LED array 31 under the first illumination state is darker than the value of the current flowing through the LED array 31 under the second illumination state, the luminance of the LEDs in the LED array 31 lit at the first illumination state is darker than that of the LEDs in the LED array 31 lit at the second illumination state. To human eyes, a round night light symbol can be recognized such that the presence of the bike at night can be always noticed. Even though the bike is kept at a continuous cycling state without sending out any signal indication, passerby and drivers of transportation tools in the proximity of the bike can be aware of the presence of the bike and know to keep a distance to the bike for avoiding occurrence of unnecessary accident.

The rocker switch 41, the brake lever 42, the emergency or standing button 43 and the night light button 44 can be independently operated and randomly combined for simultaneous operation for the LED arrays 31 of the lighting modules 30 to display the overlapped symbols and exhibit a combined signal effect. Alternatively, all symbols generated in a random and combined operation can be intermittently and alternately displayed in a blinking fashion.

In sum, the present invention allows cyclists to output multiple operation commands to the controller 20 through the operation interface 40 for the controller 20 to control the LED arrays 31 of the lighting modules 30 in generation of multiple simple and clear signal symbols. Accordingly, passerby and drivers of transportation tools in the proximity of the bike can anticipate next move of the bike to prevent the chance of accident with enough time such that the possibility of bike accident can be effectively reduced.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An LED signaling device for a bicycle, comprising:
    at least one lighting module, each one of the at least one lighting module having a light-emitting diode (LED) array mounted on a substrate, wherein the LED array has multiple LEDs arranged in the form of an array, the LED array including:
        two V-shaped portions respectively located on left and right edges of the LED array, each V-shaped portion having multiple LEDs, wherein the vertices of the two V-shaped display portions are directed to the left and right of the LED array; and
        a center line portion formed between the two V-shaped portions and having multiple LEDs;
    a controller electrically connected to each LED of the LED array to control the LED to be operated under an illumination mode or an unlit mode, wherein the illumination mode includes a first illumination state and a second illumination state, and the controller controls a value of a current flowing through the LED array during the first illumination state to be lower than the value of the current flowing through the LED array during the second illumination state, such that luminance of the LEDs of the LED array lit at the first illumination state is darker than luminance of the LEDs of the LED array lit at the second illumination state, and each LED lit under the first illumination state and the second illumination state is selectively blinked;
    a power module electrically connected to the LED array and the controller; and
    an operation interface electrically connected to the controller to output at least one operation command to the controller for the controller to drive the LED array to generate at least one corresponding signal symbol independently or intermittently displayed at the same luminance level or alternatively displayed at different luminance levels, and the operation interface having a rocker switch for sending an operation command to the controller;
    wherein a right end or a left end of the rocker switch is pressed to output a third corresponding operation command to the controller for the controller to control the LED array to display a right-turn symbol taking a form of a right arrow with the V-shaped portion on the right and the center line portion of the LED array operated under the second illumination state and the rest of the LEDs of the LED array operated under the unlit mode or a left-turn symbol taking a form of a left arrow with the V-shaped portion on the left and the center line portion of the LED array operated under the second illumination state and the rest of LEDs of the LED array operated under the unlit mode on the LED array.

2. The LED signaling device as claimed in claim 1, wherein the power module is an alkaline battery or a lithium battery.

3. The LED signaling device as claimed in claim 1, wherein the operation interface further has two push switches and at least one brake detector, and each of the push switches and the at least one brake detector serves to send an operation command to the controller.

\* \* \* \* \*